(12) United States Patent
Tang et al.

(10) Patent No.: US 12,364,215 B1
(45) Date of Patent: Jul. 22, 2025

(54) IRRIGATION DEVICE FOR SANDY LAND CROP PLANTING

(71) Applicant: Northwest Institute of Eco-Environment and Resources, Chinese Academy of Sciences, Lanzhou (CN)

(72) Inventors: Xia Tang, Lanzhou (CN); Hao Qu, Lanzhou (CN); Baoguang Shi, Lanzhou (CN)

(73) Assignee: Northwest Institute of Eco-Environment and Resources, Chinese Academy of Sciences, Lanzhou (CN)

( * ) Notice: Subject to any disclaimer, the term of this patent is extended or adjusted under 35 U.S.C. 154(b) by 0 days.

(21) Appl. No.: 19/091,938

(22) Filed: Mar. 27, 2025

(30) Foreign Application Priority Data

Jun. 25, 2024 (CN) .......................... 202410831136.0

(51) Int. Cl.
*A01G 25/09* (2006.01)
*A01G 25/16* (2006.01)

(52) U.S. Cl.
CPC .......... *A01G 25/09* (2013.01); *A01G 25/167* (2013.01)

(58) Field of Classification Search
CPC .............................. A01G 25/09; A01G 25/167
USPC ............ 239/63, 64, 722, 723, 726, 741, 742
See application file for complete search history.

(56) References Cited

U.S. PATENT DOCUMENTS

| 2012/0130552 | A1* | 5/2012 | Schmidt | A01G 25/167 700/284 |
| 2017/0172075 | A1* | 6/2017 | Bermudez Rodriguez | A01G 25/167 |
| 2021/0073540 | A1* | 3/2021 | Tran | G06T 7/0002 |
| 2021/0144903 | A1* | 5/2021 | Javault | A01M 7/0042 |
| 2021/0149406 | A1* | 5/2021 | Javault | A01C 21/005 |
| 2022/0007597 | A1* | 1/2022 | Sauder | A01G 25/095 |

FOREIGN PATENT DOCUMENTS

| CN | 218126087 U | 12/2022 |
| CN | 219069078 U | 5/2023 |
| JP | 2021061815 A | 4/2021 |

* cited by examiner

*Primary Examiner* — Steven J Ganey
(74) *Attorney, Agent, or Firm* — Bayramoglu Law Offices LLC (57) ABSTRACT

An irrigation device for sandy land crop planting is provided, including a water tank assembly, locking spraying assemblies, a detection spraying assembly, a control unit, and the like. The water tank assembly includes an outer tank body, a middle tank body, and an end tank body. Each locking spraying assembly includes a locking frame and a first spraying pipe. The detection spraying assembly includes a second spraying pipe and a support leg that can rotate circumferentially. The irrigation device for sandy land crop planting. By the arrangement of the water tank assembly that can be pulled to adjust a capacity, so that a length of the device can be adjusted. The irrigation device can be suitable for irrigating cultivated lands with different widths, without being moved back and forth for multiple times, and has high irrigation efficiency.

4 Claims, 10 Drawing Sheets

IRRIGATION DEVICE FOR SANDY LAND CROP PLANTING

CROSS REFERENCE TO THE RELATED APPLICATIONS

This application is based upon and claims priority to Chinese Patent Application No. 202410831136.0, filed on Jun. 25, 2024, the entire contents of which are incorporated herein by reference.

TECHNICAL FIELD

The present disclosure relates to the technical field of irrigation of sandy land crops, and in particular to an irrigation device for sandy land crop planting.

BACKGROUND

Long sunshine time and water resource shortage in a desert or Gobi region are important factors of limiting crop planting in this region. Improper irrigation ways cause ineffective consumption of freshwater resources, and exacerbate water use conflicts. Developing a water-saving irrigation device can increase moisture and temperature of soil, and help crop growth and nutrient absorption. Scientific and proper irrigation can improve a structure and fertility of sandy soil, increase a quantity and activity of microorganisms in the soil, and increase a land utilization rate.

The applicant previously designed a sandy land irrigation device, including a fixed bracket, a water storage container, a storage rack, an irrigation unit, a humidity sensor, a controller, and the like. The irrigation unit includes a conveying pipeline group and an irrigation spraying head. The conveying pipeline group includes a plurality of sections of conveying pipelines, and pipeline joints are arranged on the conveying pipelines. The irrigation spraying head is connected to the pipeline joints. The plurality of sections of conveying pipelines can be connected to each other. The conveying pipelines can also be connected to a conveying pump body. The humidity sensor is configured to monitor humidity inside soil. The controller is electrically connected to the conveying pump body and the humidity sensor. During actual irrigation, on the one hand, this device has a fixed water storage capacity which cannot be adjusted according to an area of a cultivated land that needs to be irrigated. Especially for a cultivated land with a large area, the device often needs to be moved back and forth between the cultivated land and a water intake place for multiple times. This reduces the irrigation efficiency and increases the irrigation costs. On the other hand, an irrigation width cannot be adjusted according to a width of the cultivated land. For a cultivated land with a width greater than the width of the irrigation device, the cultivated land often needs to be irrigated for multiple times, which can easily lead to repeated irrigation in some regions of the cultivated land, causing a waste of water resources and excessive spraying and affecting growth of crops.

SUMMARY

The present disclosure mainly aims to provide an irrigation device for sandy land crop planting. An irrigation width can be adjusted according to an actual cultivation width by arrangement of a water tank assembly that can be pulled to be adjusted, to improve the crop irrigation efficiency, thereby effectively overcoming the defects of impact on the crop irrigation efficiency and the like because an existing sandy land irrigation device has an unadjustable spraying width range.

In order to achieve the above objective, the present disclosure provides the following technical solution.

One aspect of the present disclosure provides an irrigation device for sandy land crop planting, including a water tank assembly, locking spraying assemblies, detection spraying assemblies, and a control unit, wherein the water tank assembly includes an outer tank body, a middle tank body, and an end tank body; end plates are respectively mounted on one side of the outer tank body away from the middle tank body and one side of the end tank body away from the middle tank body; one end of the middle tank body is limited to an inner wall of the outer tank body for pulling action; one end of the end tank body is limited to an inner wall of the middle tank body for pulling action;

the locking spraying assemblies are respectively mounted on a top outer wall of one end of the outer tank body close to the middle tank body and a top outer wall of one end of the middle tank body close to the end tank body; each locking spraying assembly includes a locking frame and a first spraying pipe; the first spraying pipe is arranged at a top of the locking frame; the locking frame is configured to lock the outer tank body and the middle tank body that are in a pulled-apart state or configured to lock the middle tank body and the end tank body that are in a pulled-apart state;

each detection spraying assembly is arranged on one side of each end plate away from the middle tank body; each detection spraying assembly includes a second spraying pipe and a support leg; one end of the support leg is movably connected to an outer wall of the end plate through a pin shaft; a rotation axis of the support leg is perpendicular to a side wall of the end plate; a humidity probe is mounted at one end of the support leg; a water pump is mounted above the outer tank body; the water pump is connected to a water feeding pipe and a plurality of water outlet pipes; the water feeding pipe penetrates into the outer tank body; the plurality of water outlet pipes are respectively connected to the corresponding second spraying pipe and the first spraying pipe; and the control unit is at least connected to the humidity probe and a driving mechanism of the water pump.

In an embodiment, the outer tank body, the middle tank body, and the end tank body are respectively of tetragonal structures, and corners of the tetragonal shape are rounded; the water feeding pipe is arranged on one side away from the middle tank body; and a bottom end of the water feeding pipe extends towards a bottom of the outer tank body.

In an embodiment, movement slots are respectively provided in the inner wall of the outer tank body and the inner wall of the middle tank body; silicone rubber strips are respectively embedded into an outer wall of one end of the middle tank body close to the outer tank body and an outer wall of one end of the end tank body close to the middle tank body; the movement slots and the silicone rubber strips are respectively of annular structures; and the silicone rubber strips are limited to move inside the corresponding movement slots.

In an embodiment, each locking frame is of a U-shaped structure with an opening facing downwards; two sides of a vertical part of the locking frame are mounted on an outer wall of the outer tank body or an outer wall of the middle tank body; a plurality of T-shaped locking pins are respectively horizontally inserted into the two sides of the vertical part of the locking frame; extension springs sleeve the T-shaped locking pins; through holes that are in sliding fit with the T-shaped locking pins are provided in one side of the outer tank body close to the middle tank body and one side of the middle tank body close to the end tank body, and the through holes are located at positions away from the movement slots; insertion slots for inserting the T-shaped locking pins are provided in one side of the middle tank body close to the outer tank body and one side of the end tank body close to the middle tank body; and two ends of the corresponding extension springs are connected between the outer wall of the outer tank body and an inner wall of the locking frame, or two ends of the corresponding extension springs are connected between the outer wall of the middle tank body and an inner wall of the locking frame.

In an embodiment, a sliding rail is arranged at a top of the locking frame; an I-shaped sliding block is slidably arranged inside the sliding rail; the first spraying pipe is of a T-shaped structure; a bottom of the first spraying pipe is movably connected to the I-shaped sliding block through a bearing bush; and several first spraying heads are mounted at a top of the first spraying pipe.

In an embodiment, each detection spraying assembly further includes a support plate; one end of the support leg is movably connected to the end plate by using a pin; and the support leg overlaps the support plate when rotating to a horizontal state; and when the support leg is rotated to a vertical state, the humidity probe is inserted into sandy soil.

In an embodiment, a second clamping slot is provided in a top of the support plate; a rotation slot is provided in one end of the second clamping slot; L-shaped clamping strips are respectively mounted at the top of the support plate and located on two sides of the second clamping slot; a first clamping slot is provided in one side of the support leg; L-shaped clamping plates are respectively mounted on an outer wall of the support leg and located on two sides of the first clamping slot; when the support leg is in the state of overlapping the support plate, the first clamping slot is relatively communicated to the rotation slot; a second spraying head is mounted at one end of the second spraying pipe; the other end of the second spraying pipe is connected with a disk; a waist-shaped plate is mounted at a bottom of the disk; the disk is limited to slide inside the L-shaped clamping plates or the L-shaped clamping strips; and a width of the waist-shaped plate is less than a diameter of the disk.

In an embodiment, a moving assembly is arranged at a bottom of the water tank assembly; the moving assembly includes four moving wheels and two groups of telescopic shaft assemblies with adjustable lengths; motors are mounted on the outer walls of the end plates; and the motors are configured to drive the four moving wheels to rotate.

In an embodiment, each telescopic shaft assembly includes a first square telescopic pipe; a second square telescopic pipe is inserted into one end of the first square telescopic pipe; a third square telescopic pipe is inserted into one end of the second square telescopic pipe away from the first square telescopic pipe; one end of the first square telescopic pipe away from the second square telescopic pipe and one end of the third square telescopic pipe away from the second square telescopic pipe are respectively connected with rotating shafts; one end of the first square telescopic pipe close to the second square telescopic pipe and one end of the second square telescopic pipe close to the third square telescopic pipe are respectively sleeved with ferrules; movable sleeves movably sleeve the ferrules and the rotating shafts; the movable sleeves located at two ends are connected to bottoms of the corresponding end plates; the movable sleeve located on the first square telescopic pipe is connected to the bottom of the outer tank body; and the movable sleeve located on the second square telescopic pipe is connected to a bottom of the middle tank body.

In an embodiment, the moving wheels are coaxially mounted at end portions of the corresponding rotating shafts; a second conveyor belt is arranged on the outer wall of one end plate; the second conveyor belt is configured to achieve drive connection on the rotating shafts of the two groups of telescopic shaft assemblies; a first conveyor belt is arranged on the outer wall of the other end plate, and the motor is mounted on the outer wall of the end plate; and an output shaft of the motor is in drive connection to the rotating shafts of the two groups of telescopic shaft assemblies by using the first conveyor belt.

Compared with the prior art, the present disclosure at least has the following beneficial effects:
1) By the arrangement of the water tank assembly that can be pulled to adjust a capacity, so that a length of the device can be adjusted. Compared with the prior art, the irrigation device can be suitable for irrigating cultivated lands with different widths, without being moved back and forth for multiple times, and has high irrigation efficiency. The irrigation device can also detect soil humidity in a sandy land in real time according to a humidity detector, make proper use of water resources, and avoid excessive irrigation.
2) By the arrangement of the locking frames, the T-shaped locking pins, and the telescopic shaft assemblies, the water tank assembly in a pulled state can be supported, to reduce occurrence of deformation in a joint between the outer tank body and the middle tank body and a joint between the middle tank body and the end tank body, so that the stability of use of the device is improved.
3) The first spraying pipes are movably arranged above the locking frames, so that positions of the first spraying pipes can be adjusted, to change a spraying direction. The second spraying pipes are arranged on outer sides of the end plates. After the second spraying pipes are spread, a spraying area of the device can be enlarged, and the flexibility of a spraying design of the device can be achieved.
4) By the arrangement of the detection spraying assemblies, when the support legs are in a storage state, the second spraying pipes can be stored until they are moved to a position above the support legs, which ensures a minimum length of the device in the storage state. When the support legs need to be opened, the support legs can be rotated only after the second spraying pipes are moved onto the support plates, so that limitation and control are performed on the support legs. The irrigation device has a compact structure and is flexibly and conveniently used and operated.

BRIEF DESCRIPTION OF THE DRAWINGS

To describe the technical solutions in the embodiments of the present invention more clearly, the following briefly describes the accompanying drawings required for describing the embodiments. Apparently, the accompanying drawings in the following description show merely some embodiments of the present invention, and a person of ordinary skill in the art may still derive other drawings from these accompanying drawings without creative efforts. Where.

DESCRIPTIONS OF REFERENCE NUMERALS

1: water tank assembly; 11: outer tank body; 12: middle tank body; 13: end tank body; 14: end plate; 15: movement slot; 16: silicone rubber strip;

2: locking spraying assembly; 21: locking frame; 22: sliding rail; 23: I-shaped sliding block; 24: first spraying pipe; 25: first spraying head; 26: T-shaped locking pin; 27: extension spring;

3: detection spraying assembly; 31: support leg; 311: first clamping slot; 32: humidity probe; 33: L-shaped clamping plate; 34: support plate; 341: rotation slot; 342: second clamping slot; 35: L-shaped clamping strip; 36: second spraying pipe; 37: second spraying head; 38: disk; 39: waist-shaped plate;

4: moving assembly; 41: telescopic shaft assembly; 411: first square telescopic pipe; 412: second square telescopic pipe; 413: third square telescopic pipe; 414: ferrule; 415: movable sleeve; 416: rotating shaft; 42: moving wheel; 43: first conveyor belt; 44: motor; 45: second conveyor belt;

5: mounting frame; 6: water pump; 61: water feeding pipe; 62: water outlet pipe; and 7: control unit.

DETAILED DESCRIPTION OF THE EMBODIMENTS

In order to make the aforementioned objectives, features, and advantages of the present disclosure more comprehensible, specific implementations of the present disclosure are described in detail below in conjunction with this specification and the accompanying drawings.

Embodiment 1

Referring to FIG. 1 to FIG. 10, this embodiment provides an irrigation device for sandy land crop planting, including a water tank assembly 1, locking spraying assemblies 2, detection spraying assemblies 3, a control unit, and the like. The water tank assembly includes an outer tank body 11, a middle tank body 12, and an end tank body 13. End plates 14 are respectively mounted on one side of the outer tank body 11 away from the middle tank body 12 and one side of the end tank body 13 away from the middle tank body 12. One end of the middle tank body 12 is limited to an inner wall of the outer tank body 11 for pulling action. One end of the end tank body 13 is limited to an inner wall of the middle tank body 12 for pulling action. The outer tank body 11, the middle tank body 12, the end tank body 13, and the end plates 14 form a tank body structure. A volume of the tank body increases or decreases by pulling the middle tank body 12 or pulling the end tank body 13. A length of the water tank assembly 1 can be adjusted according to a width of planting of crops. Meanwhile, after the length of the water tank assembly 1 is increased, a water capacity of the water tank assembly 1 can be increased, thus achieving adjustability of the crop irrigation device.

The locking spraying assemblies 2 are respectively mounted on a top outer wall of one end of the outer tank body 11 close to the middle tank body 12 and a top outer wall of one end of the middle tank body 12 close to the end tank body 13. Each locking spraying assembly 2 includes a locking frame 21 and a first spraying pipe 24. The first spraying pipe 24 is arranged at a top of the locking frame 21. The locking frame 21 is configured to lock the outer tank body 11 and the middle tank body 12 that are in a pulled-apart state or configured to lock the middle tank body 12 and the end tank body 13 that are in a pulled-apart state. By the arrangement of the locking frame 21 to lock the outer tank body 11 and the middle tank body 12 that are in the pulled-apart state, or the middle tank body 12 and the end tank body 13 that are in the pulled-apart state, a situation of vertical settlement of the outer tank body 11, the middle tank body 12, or the end tank body 13 due to a high water capacity can be reduced. This ensures the stability of the pulled water tank assembly 1 in a usage state.

Each detection spraying assembly 3 is arranged on one side of each end plate 14 away from the middle tank body 12. Each detection spraying assembly 3 includes a second spraying pipe 36 and a support leg 31. One end of the support leg 31 is movably connected to an outer wall of the end plate 14 through a pin shaft. A rotation axis of the support leg 31 is perpendicular to a side wall of the end plate 14. A humidity probe 32 is mounted at one end of the support leg 31. A water pump 6 is mounted above the outer tank body 11. The water pump 6 is connected to a water feeding pipe 61 and a plurality of water outlet pipes 62. The water feeding pipe 61 penetrates into the outer tank body 11. A water inlet is arranged at a position, close to the water feeding pipe 61, of a top of the outer tank body 11. The plurality of water outlet pipes 62 are respectively connected to the corresponding second spraying pipe 36 and the first spraying pipe 24. The humidity probe 32 on a side surface achieves an effect of detecting a humidity of a sandy land in real time. Furthermore, after the second spraying pipe 36 is rotated, a spraying area of the device can be further enlarged, to adapt to a sandy land with a larger planting width.

In addition, a flow adjustment valve can be further arranged on each water outlet pipe 62.

The control unit can use a microcontroller, a micro control unit (MCU), a personal computer (PC), or the like. The control unit can be connected to the humidity probe 32, a driving motor of the water pump 6, and the flow adjustment valve mentioned above, and can adjust operating states of the water pump 6 and the flow adjustment valve according to soil moisture data detected by the humidity probe 32, thereby achieving an intelligent water-saving effect.

Figure 8:
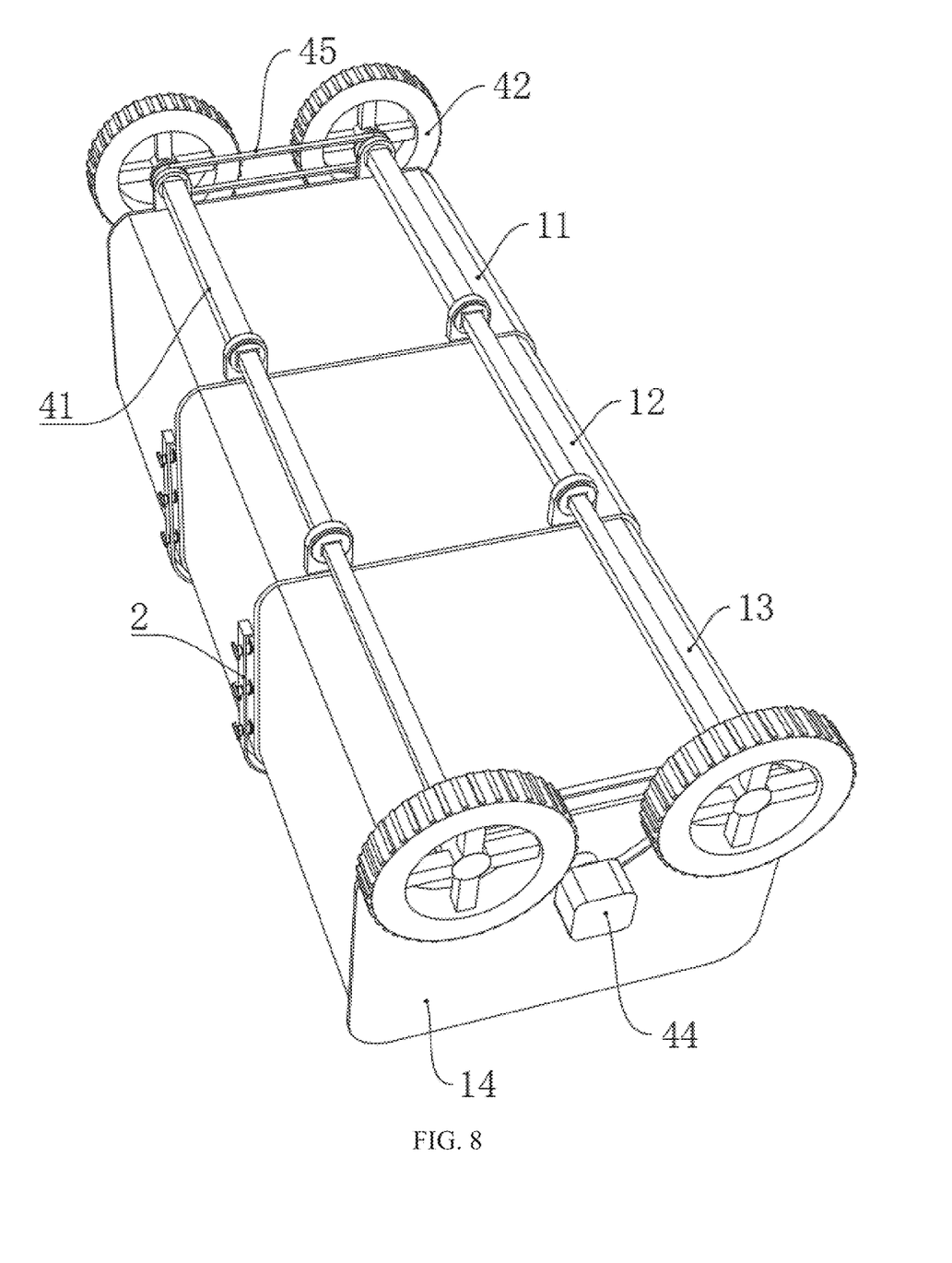
FIG. 8 is a schematic diagram of an assembled structure of a moving assembly and a water tank assembly of an irrigation device for sandy land crop planting according to an embodiment of the present disclosure.
Figure 9:
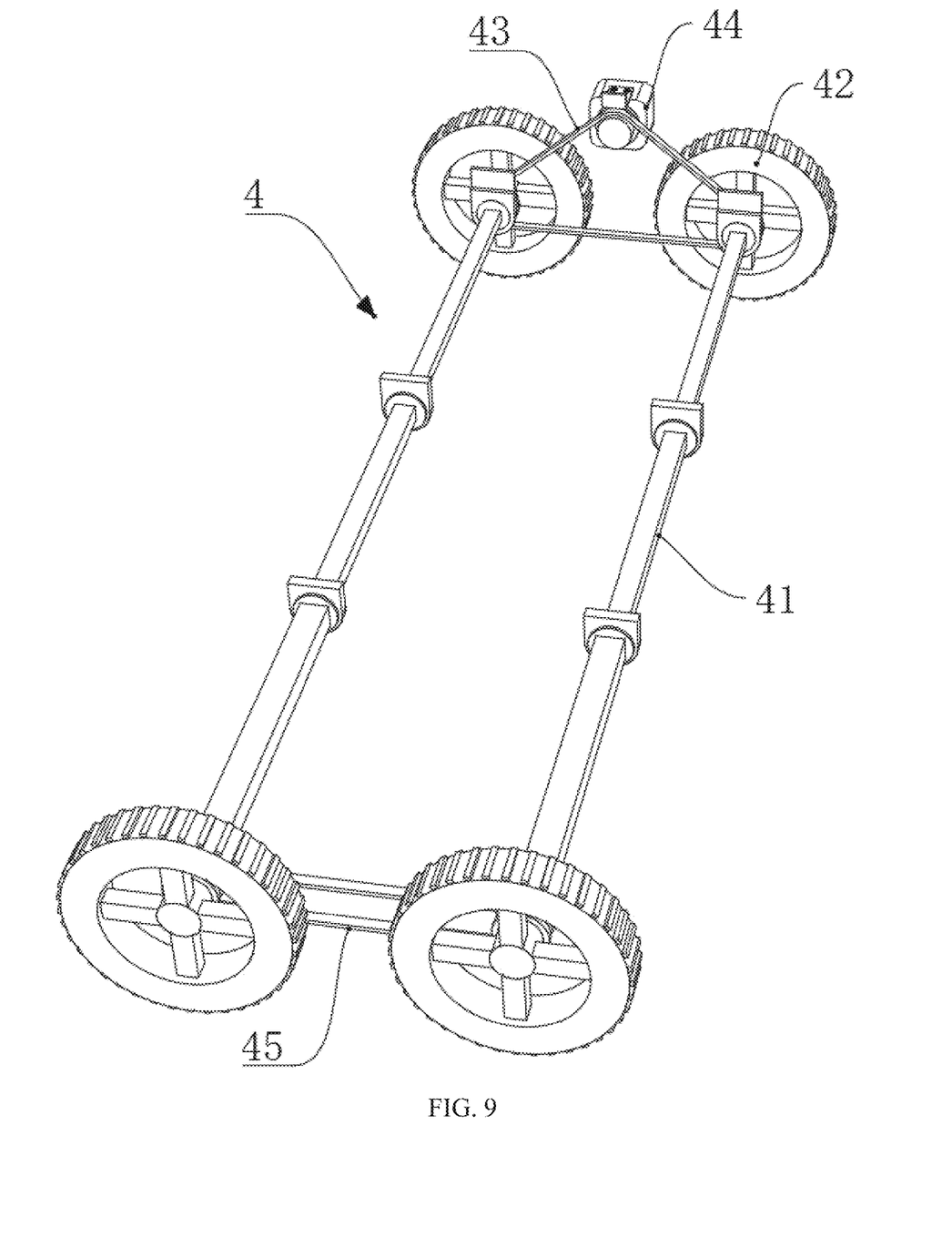
FIG. 9 is a schematic structural diagram of a moving assembly of an irrigation device for sandy land crop planting according to an embodiment of the present disclosure.
Figure 10:
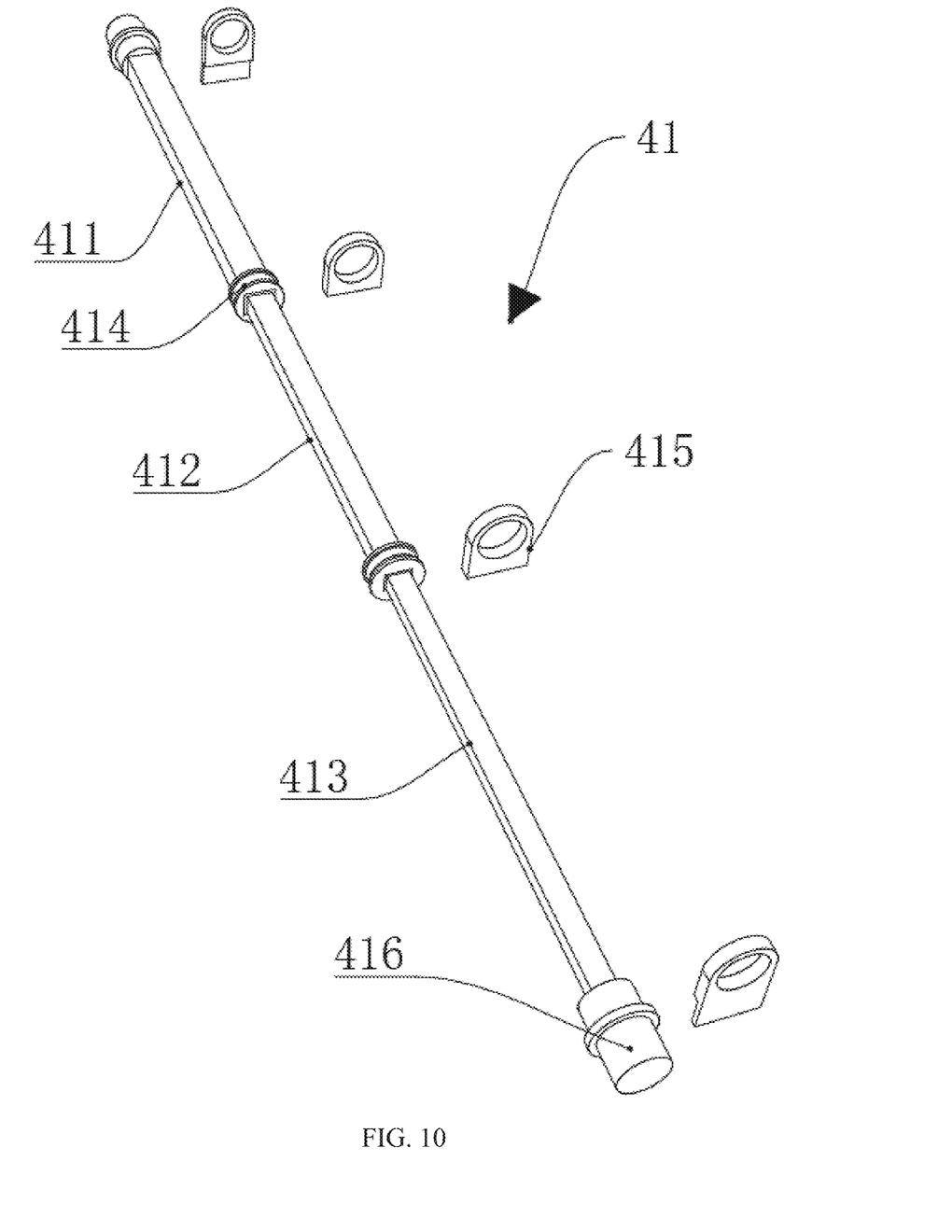
FIG. 10 is a schematic structural diagram of a telescopic shaft assembly of an irrigation device for sandy land crop planting the present disclosure.

A moving assembly 4 is arranged at a bottom of the water tank assembly 1. The moving assembly 4 includes four moving wheels 42, and two groups of telescopic shaft assemblies 41 with adjustable lengths. Motors 44 are mounted on outer walls of the end plates 14. The motors 44 are configured to drive the four moving wheels 42 to rotate. The telescopic shaft assemblies 41 can change with the length of the water tank assembly 1. Furthermore, after change, the motors 44 are turned on to always ensure rotation of the four moving wheels 42. Meanwhile, the two groups of telescopic shaft assemblies 41 play a role of supporting bottoms of the outer tank body 11, the middle tank body 12, and the end tank body 13, which further improves the stability of the water tank assembly 1.

In this embodiment, when a sandy land is irrigated in a spraying manner, a width of the sandy land is first measured. If a planting width of the sandy land is less than a maximum spraying length of the device after the device is spread, a group of device will be used. If the planting width of the sandy land is greater than the maximum spraying length of the device after the device is spread, a multiple that is less than the maximum spraying length of the device after the device is spread is taken as a reference for a quantity of groups of device used.

Figure 1:
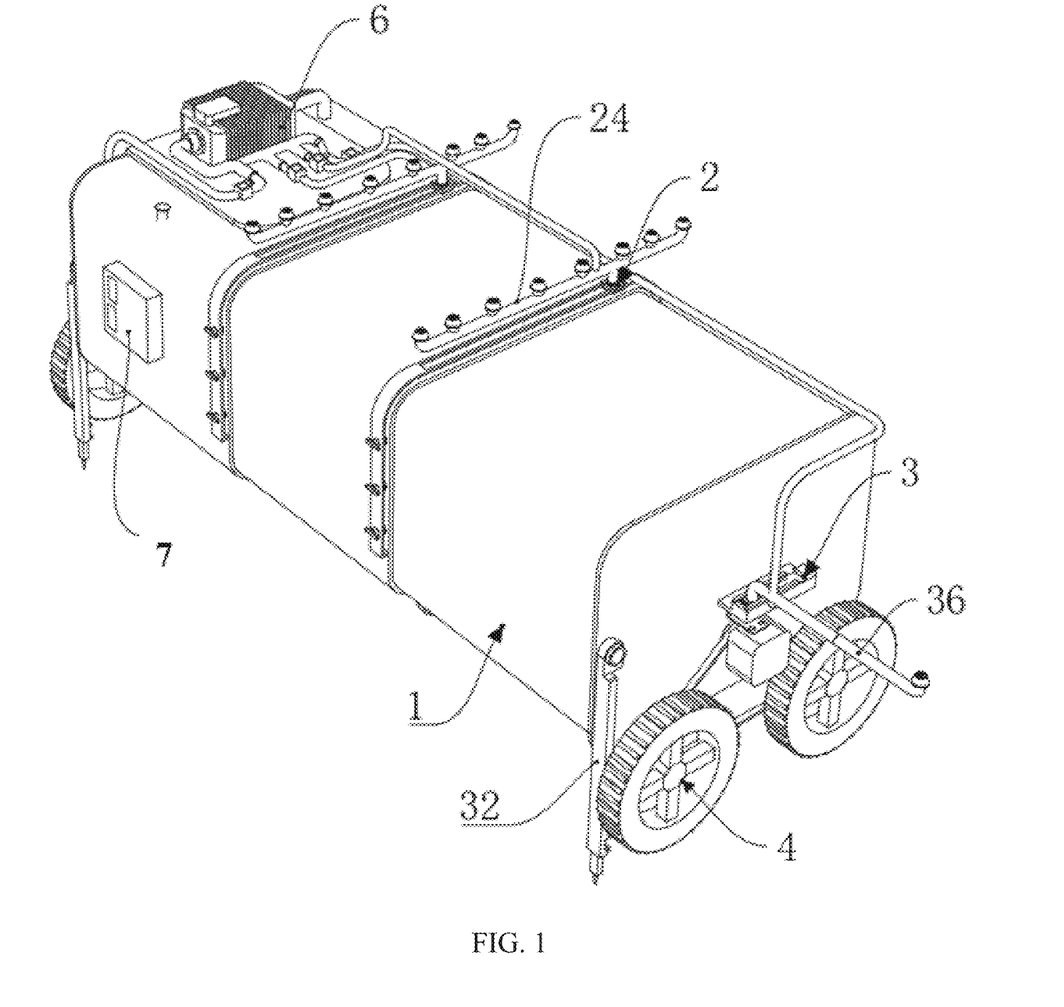
FIG. 1 is a schematic diagram of an entire structure of an irrigation device for sandy land crop planting according to an embodiment of the present disclosure.
Figure 2:
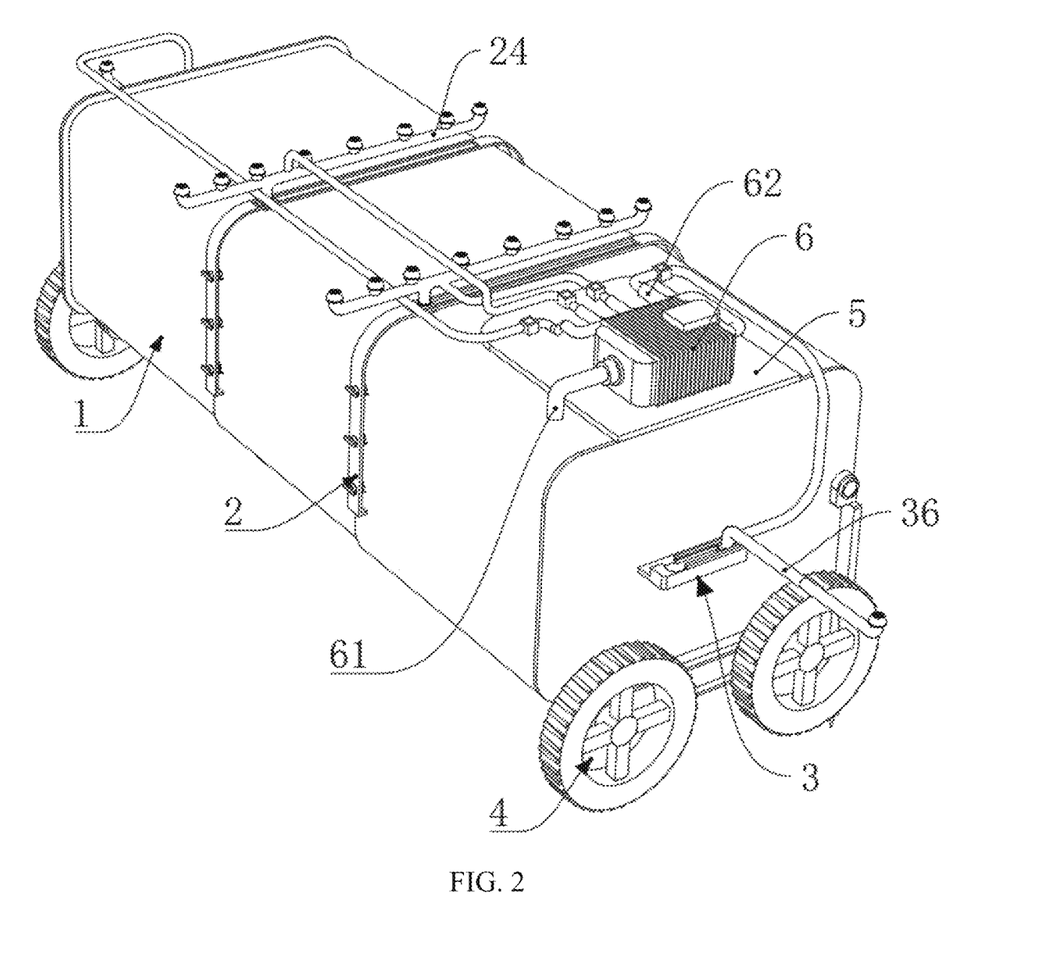
FIG. 2 is a schematic diagram of a side-view structure of an irrigation device for sandy land crop planting according to an embodiment of the present disclosure.

When the device is ready to spray the sandy land, the middle tank body 12 or the middle tank body 12 and the end tank body 13 are first pulled according to a desired length. Meanwhile, the telescopic shaft assemblies 41 at the bottom of the water tank assembly 1 are stretched cooperatively. After the middle tank body 12 is completely pulled out, the locking frames 21 are adjusted to lock the middle tank body 12 and the outer tank body 11, and then spraying positions of the first spraying pipes 24 are adjusted. If the end tank body 13 is not pulled out, a water inlet valve of the first spraying pipe 24 corresponding to the end tank body 13 is closed, and the first spraying pipe 24 corresponding to the end tank body 13 does not spray water. Further, the second spraying pipe 36 is spread as shown in FIG. 1, and the support leg 31 is rotated downwards. The humidity probe 32 is used to detect the humidity of the sandy land. After the adjustment is completed, water is injected through a water injection port of the outer tank body 11. The water pump 6 and the motor 44 are turned on. The first spraying pipe 24 starts to spray water, and the second spraying pipe 36 starts to spray water. The motor 44 moves forwards according to the humidity detected by the humidity probe 32, thereby achieving irrigation spraying on crops on the sandy land and avoiding insufficient or excessive irrigation.

Embodiment 2

Figure 3:
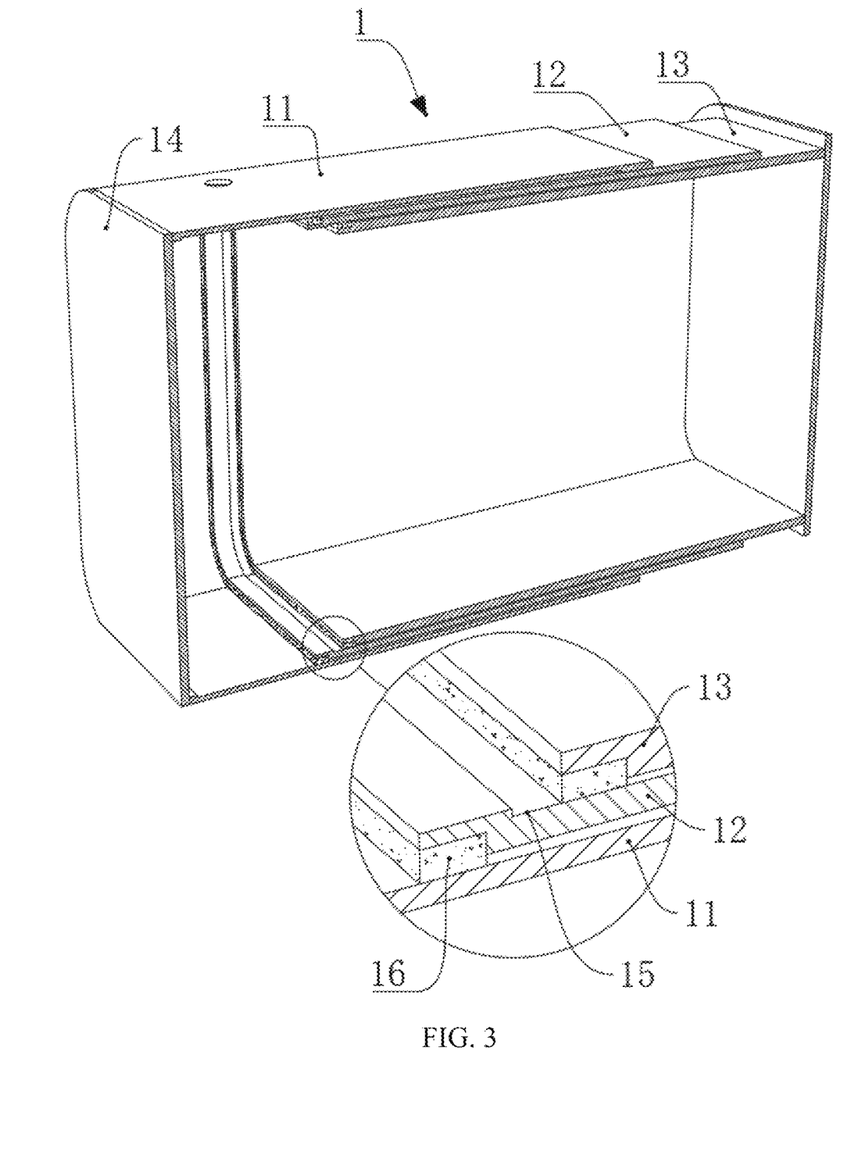
FIG. 3 is a schematic diagram of a sectional structure of a water tank assembly of an irrigation device for sandy land crop planting according to an embodiment of the present disclosure.

Referring to FIG. 1 to FIG. 5, a difference between this embodiment and Embodiment 1 is as follows:

The outer tank body 11, the middle tank body 12, and the end tank body 13 are respectively of tetragonal structures, and corners of the tetragonal shape are rounded. The rounded corners can ensure tightness of the pulled state between the outer tank body 11 and the middle tank body 12, or between the middle tank body 12 and the end tank body 13. The water feeding pipe 61 is arranged on one side away from the middle tank body 12. A bottom end of the water feeding pipe 61 extends towards a bottom of the outer tank body 11. The position of the water feeding pipe 61 does not affect pulling cooperation between the middle tank body 12 and the outer tank body 11.

Movement slots 15 are respectively provided in the inner wall of the outer tank body 11 and the inner wall of the middle tank body 12. Two ends of the movement slots 15 do not extend to two ends of the outer tank body 11, and the two ends of the movement slots 15 do not extend to two ends of the middle tank body 12. Silicone rubber strips 16 are respectively embedded into an outer wall of one end of the middle tank body 12 close to the outer tank body 11 and an outer wall of one end of the end tank body 13 close to the middle tank body 12. The movement slots 15 and the silicone rubber strips 16 are respectively of annular structures. The silicone rubber strips 16 are limited to move inside the corresponding movement slots 15.

In this embodiment, when a length of the water tank assembly 1 needs to be adjusted, the silicone rubber strip 16 on the outer wall of the middle tank body 12 moves inside the movement slot 15 in the inner wall of the outer tank body 11 by pulling the middle tank body 12. After the pulling on the middle tank body 12 is completed, the silicone rubber strip 16 is limited inside the corresponding movement slot 15. After water is injected into the outer tank body 11, it can ensure sealing of a joint between the outer tank body 11 and the middle tank body 12, thereby achieving the stability of use of the pulling-type capacity-adjustable water tank assembly 1.

The remaining structures are the same as the structures of Embodiment 1.

Embodiment 3

Figure 4:
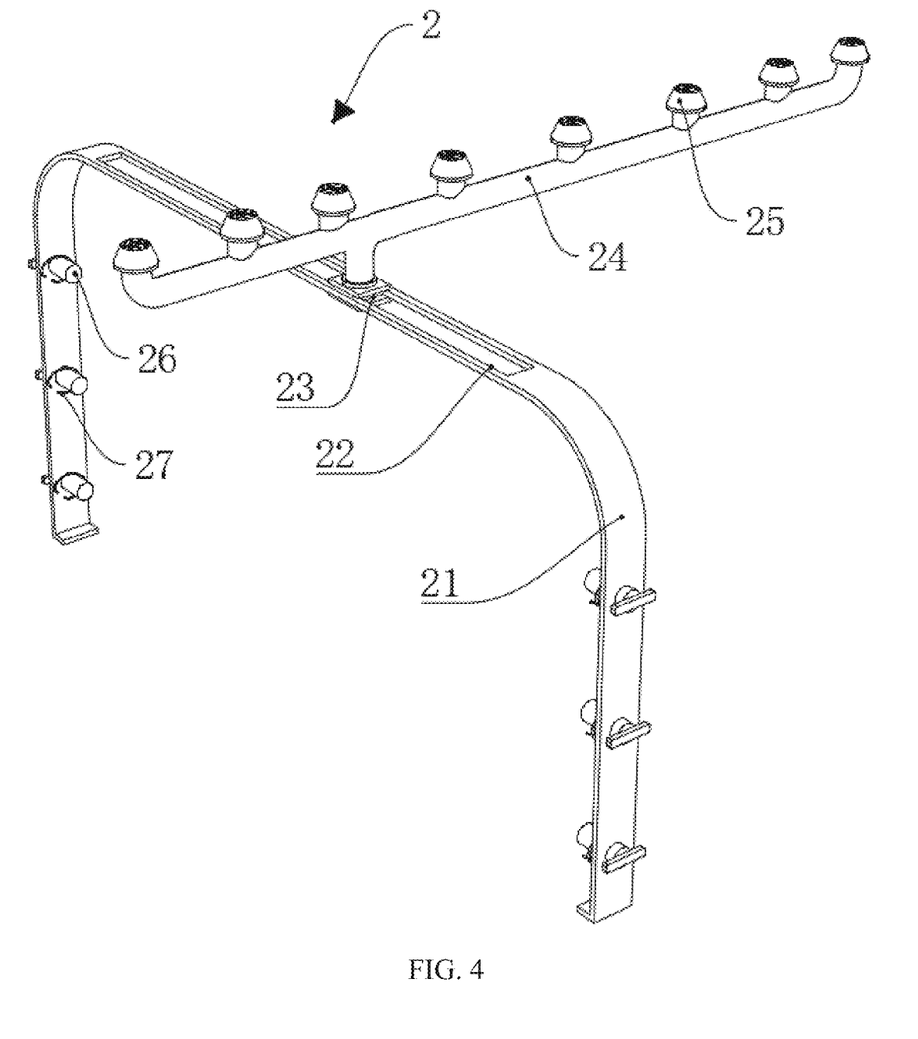
FIG. 4 is a schematic structural diagram of a locking spraying assembly of an irrigation device for sandy land crop planting according to an embodiment of the present disclosure.
Figure 5:
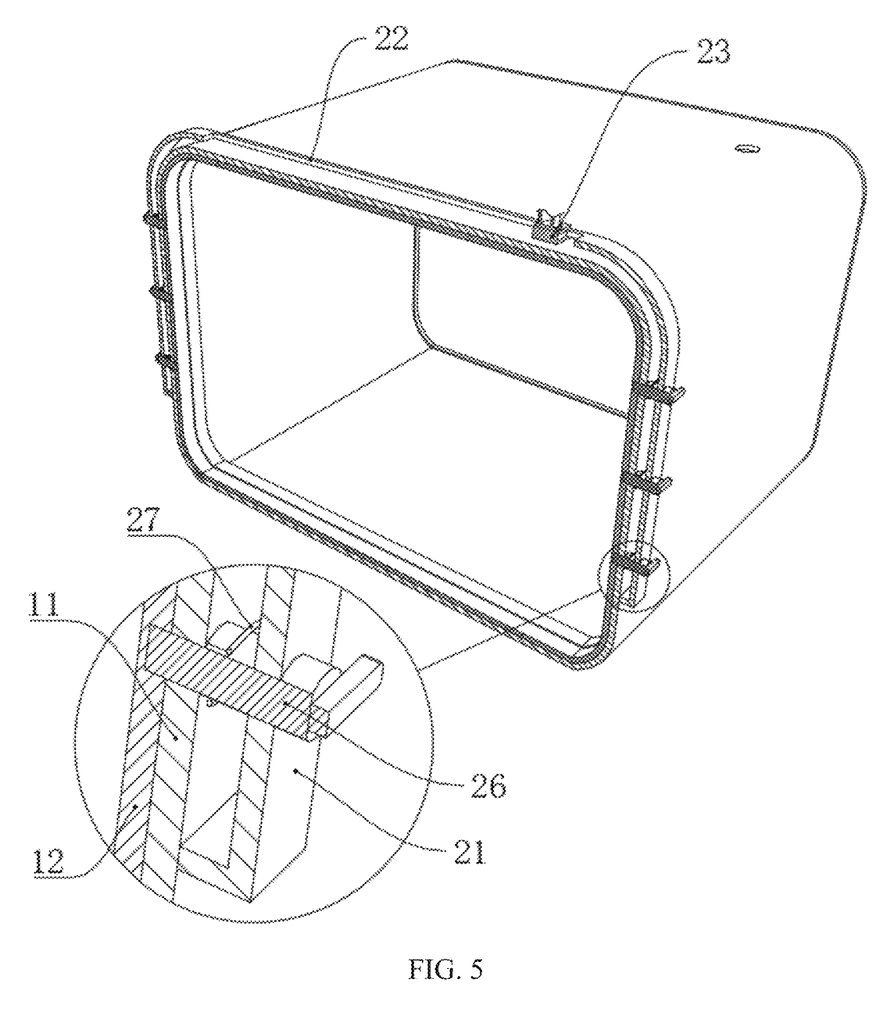
FIG. 5 is a schematic diagram of an assembled structure of a locking spraying assembly and a water tank assembly of an irrigation device for sandy land crop planting according to an embodiment of the present disclosure.

Referring to FIG. 1 to FIG. 5, a difference between this embodiment and Embodiment 2 is as follows:

Each locking frame 21 is of a U-shaped structure with an opening facing downwards. Two sides of a vertical part of the locking frame 21 are mounted on an outer wall of the outer tank body 11 or an outer wall of the middle tank body 12. A plurality of T-shaped locking pins 26 are respectively horizontally inserted into the two sides of the vertical part of the locking frame 21. At least three groups of T-shaped locking pins 26 are arranged on one side of the vertical part of the locking frame 21. Extension springs 27 sleeve the T-shaped locking pins 26. Through holes that are in sliding fit with the T-shaped locking pins 26 are provided in one side of the outer tank body 11 close to the middle tank body 12 and one side of the middle tank body 12 close to the end tank body 13, and the through holes are located at positions away from the movement slots 15. Insertion slots for inserting the T-shaped locking pins 26 are provided in one side of the middle tank body 12 close to the outer tank body 11 and one side of the end tank body 13 close to the middle tank body 12. Two ends of the corresponding extension springs 27 are connected between the outer wall of the outer tank body 11 and an inner wall of the locking frame 21, or two ends of the corresponding extension springs 27 are connected between the outer wall of the middle tank body 12 and an inner wall of the locking frame 21. When the middle tank body 12 is in a pulled state, end portions of the T-shaped locking pins 26 resist against the outer wall of the middle tank body 12 until the insertion slots of the middle tank body 12 are pulled to an end portion of the middle tank body 12. Under the driving of the extension springs 27, the outer tank body 11 and the middle tank body 12 are horizontally inserted through the T-shaped locking pins 26 to limit horizontal positions of the outer tank body 11 and the middle tank body 12, thus reducing a situation of settlement of the outer tank body 11 and the middle tank body 12.

A sliding rail 22 is arranged at atop of the locking frame 21. An I-shaped sliding block 23 is slidably arranged inside the sliding rail 22. The first spraying pipe 24 is of a T-shaped structure. A bottom of the first spraying pipe 24 is movably connected to the I-shaped sliding block 23 through a bearing bush. Several first spraying heads 25 are mounted at a top of the first spraying pipe 24. The first spraying pipe 24 can rotate around the I-shaped sliding block 23 to a transverse state, so that the several first spraying heads 25 are distributed above the water tank assembly 1. After the water tank assembly 1 is completely spread, the several spraying heads 25 are distributed above the outer tank body 11, the middle tank body 12, and the end tank body 13. The first spraying pipe 24 can move on the sliding rail 22 according to a need by pulling the I-shaped sliding block 23 to change the position of the I-shaped sliding block 23 on the sliding rail 22, to adjust a spraying position to a front side of the water tank assembly 1 or a rear side of the water tank assembly 1, which achieves a flexibly-adjustable spraying effect.

In this embodiment, by the arrangement of the locking frame 21 of the U-shaped structure, on the one hand, the U-shaped structure is used to limit deformations of a joint between the outer tank body 11 and the middle tank body 12 in a width direction, and a joint between the middle tank body 12 and the end tank body 13 in the width direction. On the other hand, the T-shaped locking pins 26 resist against the insertion slots through the through holes, to ensure the stability of the outer tank body 11, the middle tank body 12, and the end tank body 13 at the horizontal positions after pulling, thus improving the stability of the pulling-type water tank assembly 1.

The remaining structures are the same as the structures of Embodiment 2.

Embodiment 4

Figure 6:
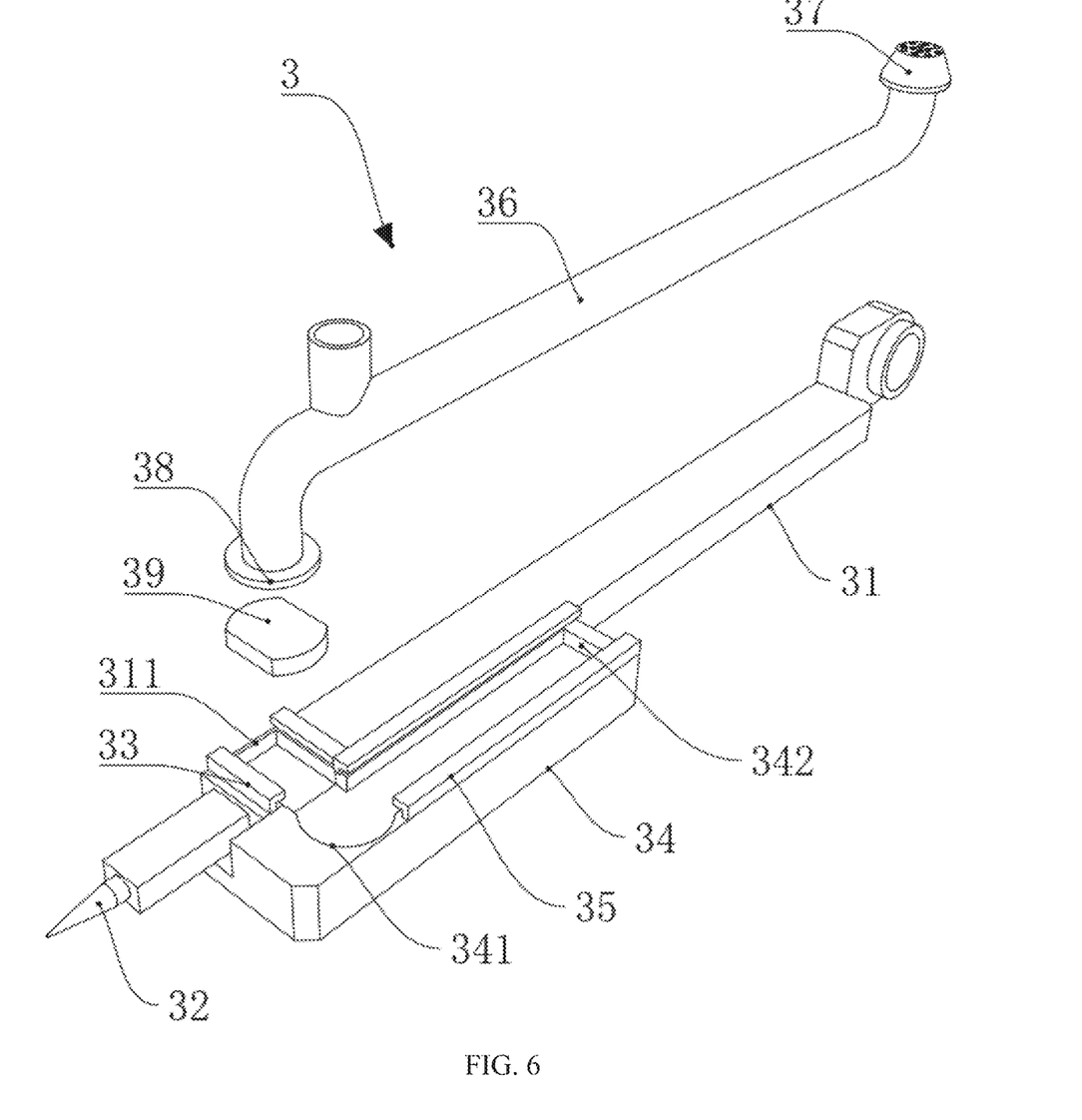
FIG. 6 is a schematic diagram of a split structure of a detection spraying assembly of an irrigation device for sandy land crop planting according to an embodiment of the present disclosure.
Figure 7:
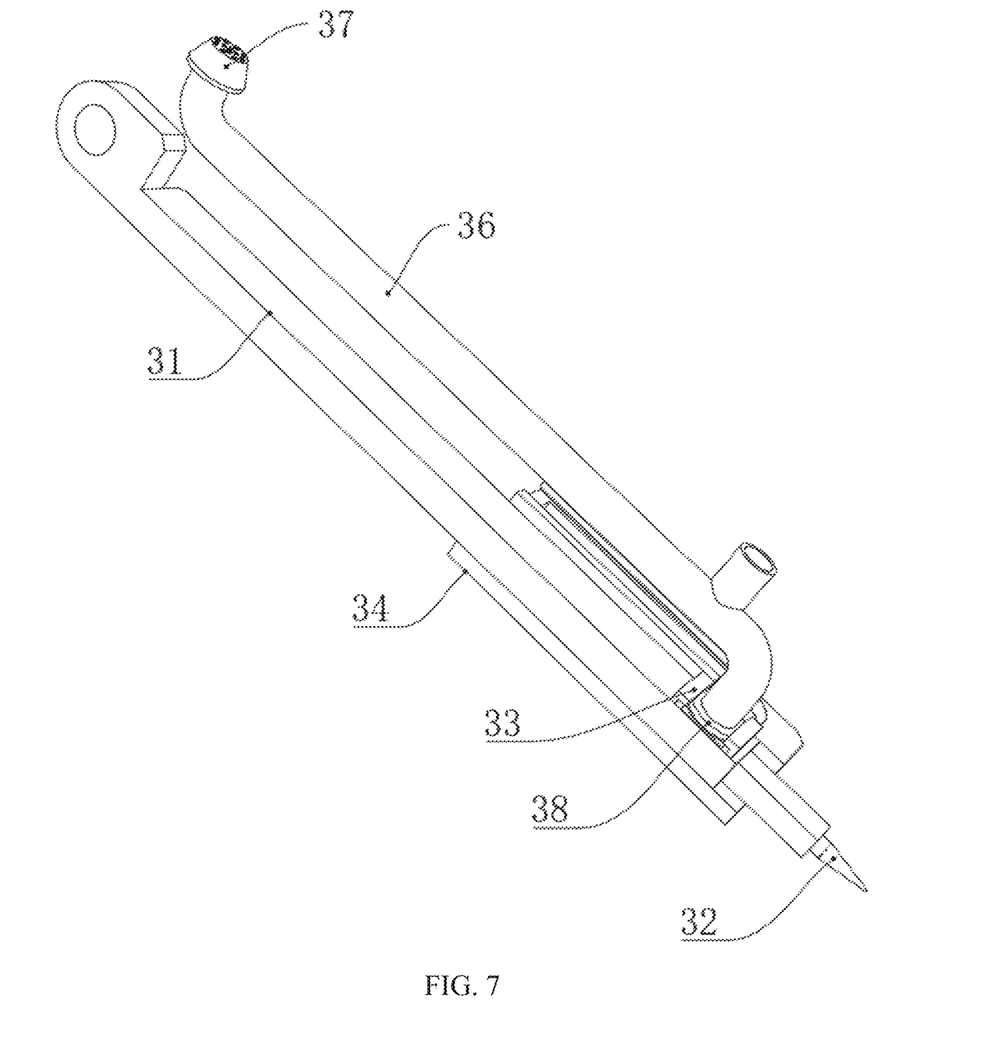
FIG. 7 is a schematic structural diagram of a detection spraying assembly of an irrigation device for sandy land crop planting according to an embodiment of the present disclosure.

Referring to FIG. 1, FIG. 2, FIG. 6, and FIG. 7, a difference between this embodiment and Embodiment 2 is as follows:

Each detection spraying assembly 3 further includes a support plate 34. One end of the support leg 31 is movably connected to the end plate 14 by using a pin shaft. The support leg 31 overlaps the support plate 34 when rotating to a horizontal state. When the support leg 31 is rotated to a vertical state, the humidity probe 32 is inserted into sandy soil. The support leg 31 has a large mass and weight. The support leg 31 overlaps the support plate 34 when rotating to the horizontal state, which is convenient for storage of the support leg 31. When the support leg 31 is rotated to the vertical state, the humidity probe 32 is inserted into the sandy soil under the gravity to detect real-time humidity of the sandy soil during spraying, to accurately determine a spraying amount and achieve proper spraying.

A second clamping slot 342 is provided in atop of the support plate 34. A rotation slot 341 is provided in one end of the second clamping slot 342. L-shaped clamping strips 35 are respectively mounted at the top of the support plate 34 and located on two sides of the second clamping slot 342. A first clamping slot 311 is provided in one side of the support leg 31. L-shaped clamping plates 33 are respectively mounted on an outer wall of the support leg 31 and located on two sides of the first clamping slot 311. When the support leg 31 is in the state of overlapping the support plate 34, the first clamping slot 311 is relatively communicated to the rotation slot 341. A second spraying head 37 is mounted at one end of the second spraying pipe 36. The other end of the second spraying pipe 36 is connected with a disk 38. A waist-shaped plate 39 is mounted at a bottom of the disk 38. The disk 38 is limited to slide inside the L-shaped clamping plates 33 or the L-shaped clamping strips 35. A width of the waist-shaped plate 39 is less than a diameter of the disk 38. When limited inside the first clamping slot 311 and the second clamping slot 342, the waist-shaped plate 39 can only linearly move. When limited inside the rotation slot 341, the waist-shaped plate 39 can rotate circumferentially. When limited inside the L-shaped clamping plates 33 or the L-shaped clamping strips 35, the disk 38 linearly slides.

In this embodiment, in an initial state, the support leg 31 is in the horizontal state and overlaps the support plate 34; the second spraying pipe 36 is parallel to the support leg 31; the waist-shaped plate 39 is limited in the first clamping slot 311; the disk 38 is limited in the L-shaped clamping plates 33; and the second spraying pipe 36 is stored above the support leg 31. In a usage state, the waist-shaped plate 39 is first pushed into the rotation slot 341 along the L-shaped clamping plates 33. The second spraying pipe 36 is then rotated outwards by 90° to be spread and linearly moved along the second clamping slot 342. The disk 38 is limited to slide inside the L-shaped clamping strips 35. The support leg 31 is then rotated from the horizontal state to the vertical state. As shown in FIG. 1, the humidity probe 32 is vertically inserted into the sandy soil. In this way, the humidity probe 32 can be conveniently stored. When the humidity probe 32 is not in use, the humidity probe will not be in contact with the ground, to avoid friction with the ground. Furthermore, when the support leg 31 is in a storage state, it is also convenient to store the second spraying pipe 36, so that the second spraying pipe 36 is stored to be parallel to the end plate 14, which saves a space occupied by the irrigation device in a non-operating state. When the humidity probe 32 needs to be used, the humidity probe 32 can be inserted into the soil due to the gravity of the support leg 31. When the irrigation device walks, the humidity probe 32 extends into the soil. Compared with a humidity probe that falls onto a surface of the soil, the humidity probe 32 can detect a humidity state of the sandy soil before spraying and a humidity state of the sandy soil after spraying more accurately and in real time, thus achieving more scientific irrigation on the sandy soil. When the second spraying pipe 36 is spread outwards in a manner of being perpendicular to the end plate 14, a wider spraying range of the irrigation device can be achieved.

The remaining structures are the same as the structures of Embodiment 3.

Embodiment 5

Referring to FIG. 1, FIG. 2, FIG. 8, FIG. 9, and FIG. 10, a difference between this embodiment and Embodiment 2 is as follows:

Each telescopic shaft assembly 41 includes a first square telescopic pipe 411. A second square telescopic pipe 412 is inserted into one end of the first square telescopic pipe 411. A third square telescopic pipe 413 is inserted into one end of the second square telescopic pipe 412 away from the first square telescopic pipe 411. A cross section of the telescopic shaft assembly 41 is of a square pipe structure. Compared with a round pipe, the first square telescopic pipe 411, the second square telescopic pipe 412, and the third square telescopic pipe 413 can be rotated synchronously due to matching of square structures. One end of the first square telescopic pipe 411 away from the second square telescopic pipe 412 and one end of the third square telescopic pipe 413 away from the second square telescopic pipe 412 are respectively connected with rotating shafts 416. One end of the first square telescopic pipe 411 close to the second square telescopic pipe 412 and one end of the second square telescopic pipe 412 close to the third square telescopic pipe 413 are respectively sleeved with ferrules 414. Movable sleeves 415 movably sleeve the ferrules 414 and the rotating shafts 416. The movable sleeves 415 located at two ends are connected to bottoms of the corresponding end plates 14. The movable sleeve 415 located on the first square telescopic pipe 411 is connected to the bottom of the outer tank body 11, and the movable sleeve 415 located on the second square telescopic pipe 412 is connected to a bottom of the middle tank body 12. Square holes are provided in inner sides of the ferrules 414, and outer walls of the ferrules are of circular structures. The ferrules 414 are movably connected to the movable sleeves 415 through bearing bushes.

The moving wheels 42 are coaxially mounted at end portions of the corresponding rotating shafts 416. A second conveyor belt 45 is arranged on the outer wall of one end plate 14. The second conveyor belt 45 is configured to achieve drive connection on the rotating shafts 416 of the two groups of telescopic shaft assemblies 41. A first conveyor belt 43 is arranged on the outer wall of the other end plate 14, and the motor 44 is mounted on the outer wall of the end plate 14. An output shaft of the motor 44 is in drive connection to the rotating shafts 416 of the two groups of telescopic shaft assemblies 41 by using the first conveyor belt 43. The first conveyor belt 43 and the second conveyor belt 45 are synchronous tooth belts. Spline groove structures are provided on outer walls of the corresponding rotating shafts 416, to improve the stability of movement on a sandy land.

In this embodiment, when the device needs to be moved, the motors 44 are turned on to drive the first conveyor belt 43, so that the two groups of telescopic shaft assemblies 41 are driven, and the second conveyor belt 45 at the other ends of the two groups of telescopic shaft assemblies 41 is driven. Thus, the four groups of moving wheels 42 rotate in the same direction, to drive the device to move forwards.

The remaining structures are the same as the structures of Embodiment 4.

It should be noted that the above embodiments are only used to explain the technical solutions of the present disclosure and not intended to limit the technical solutions. Although the present disclosure has been described in detail with reference to the preferred embodiments, those of ordinary skill in the art should understand that the technical solutions of the present disclosure can be modified or equivalently replaced without departing from the spirit and scope of the technical solutions of the present disclosure, which should fall within the scope of the claims of the present disclosure.

What is claimed is:

1. An irrigation device for sandy land crop planting, comprising a water tank assembly, locking spraying assemblies, detection spraying assemblies, and a control unit,
   wherein the water tank assembly comprises an outer tank body, a middle tank body, and an end tank body; end plates are respectively mounted on a first side of the outer tank body away from the middle tank body and a first side of the end tank body away from the middle tank body; a first end of the middle tank body is limited to an inner wall of the outer tank body for a pulling action; and an end of the end tank body is limited to an inner wall of the middle tank body for the pulling action;
   the locking spraying assemblies are respectively mounted on a top outer wall of an end of the outer tank body adjacent to the middle tank body and a top outer wall of a second end of the middle tank body adjacent to the end tank body; each of the locking spraying assemblies comprises a locking frame and a first spraying pipe; the first spraying pipe is arranged at a top of the locking frame; and the locking frame is configured to lock the outer tank body and the middle tank body or configured to lock the middle tank body and the end tank body, wherein the outer tank body and the middle tank body are in a pulled-apart state, and the middle tank body and the end tank body are in the pulled-apart state;
   each of the detection spraying assemblies is arranged on a side of each of the end plates away from the middle tank body; each of the detection spraying assemblies comprises a second spraying pipe, a support plate, and a support leg; a first end of the support leg is movably connected to an outer wall of each of the end plates through a pin shaft; a rotation axis of the support leg is perpendicular to a side wall of each of the end plates; a humidity probe is mounted at a second end of the support leg; a water pump is mounted above the outer tank body; the water pump is connected to a water feeding pipe and a plurality of water outlet pipes; the water feeding pipe penetrates into the outer tank body; and the plurality of water outlet pipes are respectively connected to the corresponding second spraying pipe and the first spraying pipe;
   the control unit is at least connected to the humidity probe and a driving mechanism of the water pump;
   movement slots are respectively provided in the inner wall of the outer tank body and the inner wall of the middle tank body; silicone rubber strips are respectively embedded into an outer wall of the first end of the middle tank body adjacent to the outer tank body and an outer wall of the end of the end tank body adjacent to the middle tank body; and the movement slots and the silicone rubber strips are respectively of annular structures; and the silicone rubber strips are limited to move inside the corresponding movement slots;
   each locking frame is of a U-shaped structure with an opening facing downwards; two sides of a vertical part of the locking frame are mounted on an outer wall of the outer tank body or an outer wall of the middle tank body; a plurality of T-shaped locking pins are respectively horizontally inserted into the two sides of the vertical part of the locking frame; extension springs sleeve the plurality of T-shaped locking pins; through holes are provided in a second side of the outer tank body adjacent to the middle tank body and a first side of the middle tank body adjacent to the end tank body, and the through holes are located at positions away from the movement slots, wherein the through holes are in a sliding fit with the plurality of T-shaped locking pins; insertion slots for inserting the plurality of T-shaped locking pins are provided in a second side of the middle tank body adjacent to the outer tank body and a second side of the end tank body adjacent to the middle tank body; and two ends of the corresponding extension springs are connected between the outer wall of the outer tank body and an inner wall of the locking frame, or the two ends of the corresponding extension springs are connected between the outer wall of the middle tank body and the inner wall of the locking frame;

a first end of the support leg is movably connected to each of the end plates by using a pin; the support leg overlaps the support plate when rotating to a horizontal state; and when the support leg is rotated to a vertical state, the humidity probe is inserted into a sandy soil;

a second clamping slot is provided in a top of the support plate; a rotation slot is provided in an end of the second clamping slot; L-shaped clamping strips are respectively mounted at the top of the support plate and located on two sides of the second clamping slot; a first clamping slot is provided in a side of the support leg; L-shaped clamping plates are respectively mounted on an outer wall of the support leg and located on two sides of the first clamping slot; when the support leg is in the horizontal state of overlapping the support plate, the first clamping slot is relatively communicated to the rotation slot; a second spraying head is mounted at a first end of the second spraying pipe; a second end of the second spraying pipe is connected with a disk; a waist-shaped plate is mounted at a bottom of the disk; the disk is limited to slide inside the L-shaped clamping plates or the L-shaped clamping strips; and a width of the waist-shaped plate is less than a diameter of the disk;

a moving assembly is arranged at a bottom of the water tank assembly; the moving assembly comprises four moving wheels and two groups of telescopic shaft assemblies with adjustable lengths; motors are mounted on the outer walls of the end plates; and the motors are configured to drive the four moving wheels to rotate; and each of the two groups of telescopic shaft assemblies comprises a first square telescopic pipe; a second square telescopic pipe is inserted into a first end of the first square telescopic pipe; a third square telescopic pipe is inserted into an end of the second square telescopic pipe away from the first square telescopic pipe; a second end of the first square telescopic pipe away from the second square telescopic pipe and an end of the third square telescopic pipe away from the second square telescopic pipe are respectively connected with rotating shafts; the first end of the first square telescopic pipe adjacent to the second square telescopic pipe and the end of the second square telescopic pipe adjacent to the third square telescopic pipe are respectively sleeved with ferrules; movable sleeves movably sleeve the ferrules and the rotating shafts; the movable sleeves located at two ends are connected to bottoms of the corresponding end plates; the movable sleeve located on the first square telescopic pipe is connected to a bottom of the outer tank body; and the movable sleeve located on the second square telescopic pipe is connected to a bottom of the middle tank body.

2. The irrigation device for the sandy land crop planting according to claim 1, wherein the outer tank body, the middle tank body, and the end tank body are respectively of tetragonal structures, and corners of the tetragonal structures are rounded; the water feeding pipe is arranged on a side away from the middle tank body; and a bottom end of the water feeding pipe extends towards the bottom of the outer tank body.

3. The irrigation device for the sandy land crop planting according to claim 1, wherein a sliding rail is arranged at the top of the locking frame; an I-shaped sliding block is slidably arranged inside the sliding rail; the first spraying pipe is of a T-shaped structure; a bottom of the first spraying pipe is movably connected to the I-shaped sliding block through a bearing bush; and a plurality of first spraying heads are mounted at a top of the first spraying pipe.

4. The irrigation device for the sandy land crop planting according to claim 1, wherein the four moving wheels are coaxially mounted at end portions of the corresponding rotating shafts; a second conveyor belt is arranged on an outer wall of a first end plate; the second conveyor belt is configured to achieve a drive connection on the rotating shafts of the two groups of telescopic shaft assemblies; a first conveyor belt is arranged on an outer wall of a second end plate, and the motor is mounted on the outer wall of the second end plate; and an output shaft of the motor is in the drive connection to the rotating shafts of the two groups of telescopic shaft assemblies by using the first conveyor belt.

* * * * *